Dec. 29, 1936.  F. B. MULLIN  2,065,822

SPRING SHACKLE

Filed Jan. 22, 1936

INVENTOR
Frank B. Mullin.

WITNESS
F. J. Hartman.

BY George K. Miller
ATTORNEY

Patented Dec. 29, 1936

2,065,822

UNITED STATES PATENT OFFICE 2,065,822

SPRING-SHACKLE

Frank B. Mullin, Elmira, N. Y., assignor to Trayer Products Incorporated, Elmira, N. Y., a corporation of New York Application January 22, 1936, Serial No. 60,208

6 Claims. (Cl. 267—54)

My invention relates to shackles such as are commonly used to connect the ends of automobile springs with the frame of the car, either directly or through the medium of suitable hangers secured thereto, so as to afford the requisite capacity for relative movement between the springs and the frame when the car is traveling over a rough or undulating surface.

Spring shackles of the general type disclosed in U. S. Patent 1,534,193, granted April 21, 1925, to William A. Tryon, comprising side links having conical pockets adjacent their ends, transversely extending pins having correspondingly conical ends forming a bearing fit in said pockets and spring means acting to press the links oppositely inwardly onto the ends of the pins to thereby maintain said fit and compensate for wear between the relatively moving bearing surfaces of the pins and links, were used very extensively in the automotive industry subsequent to the issue of said patent and satisfactorily fulfilled engineering and operating requirements during a period in which the riding qualities of automobiles were not stressed to the extent that they are today and the necessity for extreme freedom of movement between the relatively moving parts of an automotive shackle was therefore less essential than at present. However of recent years, more and more attention has been devoted to improving such riding qualities and the trade has consequently demanded a freedom of movement under all conditions which it is difficult to attain in a shackle of the type in question for the reason that to prevent the side links from being forced off the ends of the pins under abnormal riding conditions it is necessary that the pin ends and the corresponding pockets in the links designed to receive them be relatively gradually tapered, usually at an angle of approximately 11° to the pin axis, and a relatively heavy spring be employed to urge the links oppositely inwardly on the pins, so that even under the best conditions of adjustment and lubrication considerable resistance to relative movement between the pins and links is set up. Moreover, the resistance correspondingly and rapidly increases if through neglect or for any other reason the conical bearing surfaces are inadequately lubricated or if through careless adjustment the tension of the spring is increased beyond that intended by the shackle manufacturer, with the result that when either or both these conditions arise a marked diminution in the easy riding qualities of the automobile of which the shackles form a component immediately occurs.

It is therefore the principal object of my invention to provide an automotive spring shackle embodying all the advantages of shackles of the general character of those to which I have referred but which is so designed and constructed as to afford extreme freedom of movement between its relatively moving parts under operating conditions even though it is inadequately lubricated or improperly adjusted.

Further objects of the invention are to provide an automotive spring shackle comprising separate bearings for reception respectively of vertical and lateral thrusts and so constructed as to automatically compensate for wear between the relatively moving parts of the lateral thrust bearings to thereby preserve the requisite snugness of fit between them whereby play, looseness and consequent rattling or other noises due to side sway of the car are entirely eliminated.

A still further object is the provision of such a shackle in which the taper of the conical portions of the pin ends and corresponding taper of the bearing surfaces of the links is materially greater than in the type of wear compensating shackle to which I have referred, and in which a relatively light spring may be utilized to maintain the requisite engagement between said surfaces with consequent minimization of friction and/or wedging action between them yet in which it is impossible for the links to become disengaged, that is, jump off, from the ends of the pins even under the most abnormal conditions of operation.

Another object of the invention is to provide a shackle of the character aforesaid which is simple in design and construction, may be manufactured at a relatively low cost and is adapted for installation in place of the shackles commonly employed without requiring any structural changes or redesigning of existing car models so it may be readily utilized by automotive manufacturers for new cars or as replacements for shackles already on existing cars; which is readily assembled on the production lines without the necessity for careful adjustment to obtain the intended riding qualities in the car, and which can be readily taken apart by the ordinary garage mechanic or even the car owner and properly reassembled on the car without liability of detracting from its riding qualities.

Still another object of the invention is to provide a shackle of the character aforesaid which is so constructed as to afford lubricant reservoirs of large size which may be packed with grease, heavy oil or other suitable lubricant at the time of assembly in amounts sufficient to properly and automatically lubricate the wearing parts throughout a considerable period of use without any attention, and thus in effect to provide a shackle which is substantially self-lubricating and in which the lubricant can be readily replenished by ordinary means when it eventually becomes necessary, but which is so designed that even if the lubricant initially supplied is not replenished after it is expended and the shackle thus allowed to run dry, it will nevertheless operate satisfactorily without excessive wear and/or friction between its relatively moving bearing surfaces for long periods of time due to the fact that although the principal vertical load bearing surfaces are theoretically in line contact only they actually contact throughout relatively large areas with consequent minimization of bearing pressure, while the conical lateral thrust bearing surfaces, though under constant yielding compression, have little tendency to bind even under these conditions.

Other objects, advantages and novel features of design, construction and arrangement comprehended by the invention are hereinafter more particularly pointed out or will be readily apparent to those skilled in the art from the following description of two different forms of shackle constructed in accordance therewith and illustrated in the accompanying drawing in which.

The same characters are used to designate corresponding parts throughout the drawing.

Figure 1:
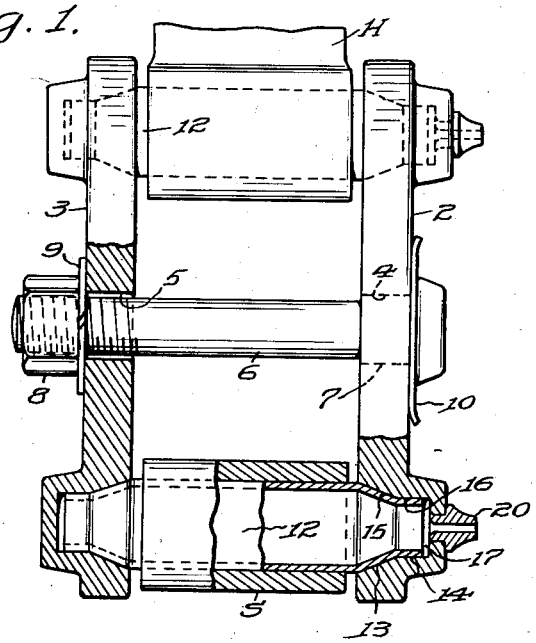
Fig. 1 is a rear elevation in one of said shackles in operative assembly with a car spring and hanger partially broken away into vertical section.
Figure 2:
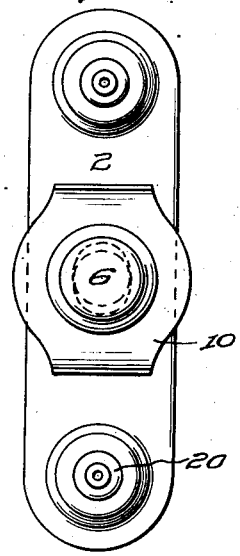
Fig. 2 is a side elevation partially in vertical section of the said shackle removed from the car.

Both of the shackles illustrated are designed to form a connecting medium between two relatively movable members, such, for example, as a hanger H attached to the car frame and a spring S only the eye of which is indicated, and I shall first refer more particularly to the shackle shown in Figs. 1 and 2. This shackle comprises a pair to side links 2, 3 respectively disposed on opposite sides of the hanger and spring eye which lie in the same vertical plane. These links are substantially identical in construction and each comprises a generally flat plate of metal of sufficient size, shape and thickness to sustain the duty imposed upon it, having adjacent each end a pocket designed for reception of the adjacent end of one of the shackle pins hereinafter described. The link 2 is provided adjacent its center with a preferably oval bolt hole 4 and the link 3 with a circular bolt hole 5 in substantial alignment therewith for the passage of a transversely extending bolt 6 having an elliptical boss 7 beneath its head adapted to enter the hole 4 and prevent the bolt from turning. The bolt is threaded adjacent its non-headed end and projects beyond link 3 to receive a nut 8 and lock washer 9 or other means suitable for preventing the nut from backing off.

A spring 10 preferably of the plate type, provided at its center with a hole for the passage of the bolt, is interposed between the head of the latter and the adjacent face of link 2 and tends to draw the two links toward each other in the assembled shackle and thus onto the ends of the pins 12 which extend transversely between them. These pins are cylindrical and preferably hollow and are respectively rigidly secured by press fit or otherwise in hanger H and spring S with their ends projecting therebeyond and into the link pockets; each pin is desirably made from a single piece of tubing of suitable diameter and wall thickness and is suitably constricted adjacent its extremities to provide a conical lateral thrust bearing surface 13 extending outwardly beyond the body of the pin and a cylindrical vertical thrust bearing surface 14 extending from the outer and smaller end of the conical surface to the extremity of the pin. These surfaces are smoothly finished and the conical surface is so disposed that the angle included between it and the pin axis approximates 22½°, while the diameter of the cylindrical portion of the pin lying beyond the conical surface is desirably only slightly greater than the radius of the body of the pin.

The pockets in the ends of the links are formed to provide corresponding conical and cylindrical surfaces 15 and 16, each conical surface 15 thus inclining inwardly from the inner face of its link and the cylindrical surface 16 extending therebeyond for a distance somewhat greater than the axial length of the cylindrical surface 14 so that when the parts are assembled a clearance 17 is provided between the end of each pin and the bottom of its pocket, the surfaces in the latter being of course likewise smoothly finished for bearing engagement with the corresponding surfaces of the pin. A lubricating nipple 20 may be inserted in a suitable hole in the bottom of each pocket of one of the links.

Preparatory to assembling the shackle on the car the pins are seated in the hanger H and spring eye S or other corresponding parts which are then brought into substantial alignment, the links are next placed over the ends of the pins and the bolt with the spring disposed beneath its head pushed through the holes in the links until the spring contacts the outer face of link 2 after which the lock washer is slipped over its projecting end and the nut threaded thereon and set up until the spring is drawn substantially flat against the face of the adjacent link, the strength of the spring being so calculated that when in this position it will exert sufficient pressure on the links to maintain the conical bearing surfaces thereof in bearing engagement with the corresponding surfaces of the pins. Of course as wear takes place between these surfaces a slight increase in the curvature or bowing of the spring gradually occurs but as this wear is very slight during the life of the shackle the change in the condition of the spring after many thousands of miles of use is practically inappreciable and a substantially constant pressure is thus exerted by it to urge the links toward each other and maintain suitable bearing engagement between the respective conical surfaces thereby automatically compensating for any wear between them.

It will be apparent that while some part of the vertical thrust exerted on the shackle by the car body and load is taken on the conical bearing surfaces, the major portion of this thrust is taken on the cylindrical portions 14 of the pins and theoretically on a line parallel with the pin axis. Viewed practically, however, when the pin ends are snugly fitted initially in the cylindrical portions of the pockets, they contact therewith throughout approximately 180° of the respective cylindrical surfaces, or 90° in either direction from said theoretical line, and the vertical thrust is thus distributed over a relatively large area to maintain the bearing pressure per unit area, which is at its maximum adjacent said line, at a relatively low value so that a very free working bearing is provided. Of course in time some wear will take place between the cylindrical surfaces but it is in reality distributed over more than 180° thereof due to the frequently changing direction of the vertical thrust and since the latter is exerted in a direction to constantly maintain at least a portion of the cylindrical wall of each pocket and the cylindrical end of the adjacent pin in engagement, particularly in modern cars having two-way shock absorbers which dampen and modify the oscillations of the springs in both directions, rattling or noise due to such wear is substantially inhibited, while any wear taking place between the conical lateral thrust surfaces is promptly compensated by the action of the spring as hitherto explained, the clearance 17 between the ends of the pins and bottoms of the pockets allowing the links to progressively move farther up on the pins as such wear takes place.

As the pins are preferably made hollow they have large lubricant containing capacity and may be packed with heavy oil or light grease or other suitable lubricant preparatory to assembly in the shackle, which can be replenished when and as necessary through nipples 20 in the ordinary way; this lubricant works out onto the bearing surfaces when the shackle is in use and adequately serves to keep them in proper condition at all times as long as a supply is maintained within the pins.

Figure 3:
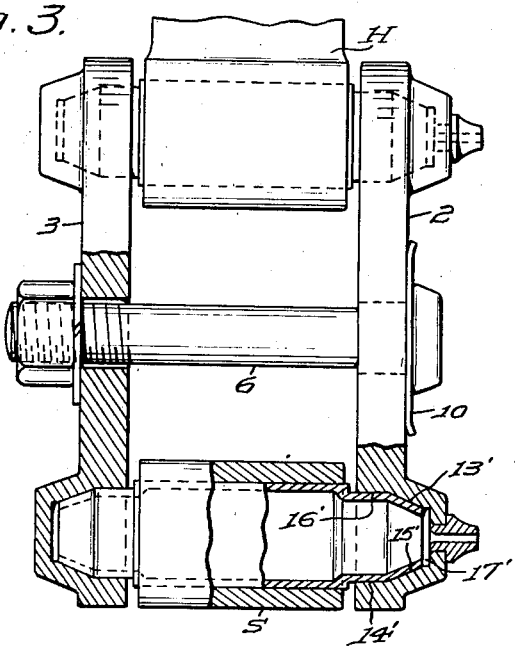
Fig. 3 is a view similar to Fig. 1 of the other of said shackles.
Figure 4:
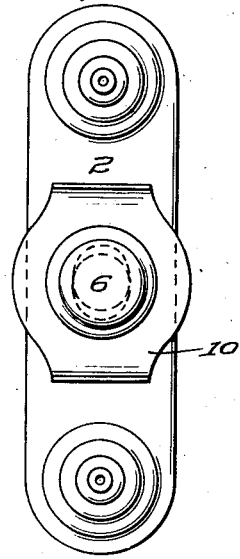
Fig. 4 is a view thereof similar to Fig. 2.

In the form of the invention shown in Figs. 3 and 4, the arrangement of the bolt, spring and associated parts is similar to that already described. However, in this instance, the cylindrical vertical thrust sustaining surfaces 14' on the pins are respectively disposed between the body of the pin and the conical surfaces 13' adjacent its extremities, while the pockets in the links are correspondingly formed with cylindrical surfaces 16' adjacent the inner faces of the links and conical surfaces 15' adjacent the bottoms of the pockets, clearance 17' being afforded by a short cylindrical bore interposed between the smaller end of the conical surface 15' and the bottom of the pocket. The vertical thrust exerted by the load and body of the car is thus principally taken on the cylindrical bearing portions 14' of the pins and pockets while the conical surfaces thereof receive the lateral thrust and are continuously kept in suitable bearing engagement through the action of spring 10 as already described. With this construction the vertical load is carried somewhat farther from the ends of the pins and it is usually possible to provide a bearing of greater effective area for its reception than in the construction illustrated in Figs. 1 and 2 which in certain cases is advantageous and may therefore be preferred. Since the method of assembly and operation of this form of shackle is substantially similar to the form hitherto described, extended reference thereto would be superfluous.

It will thus be apparent that I have provided a shackle comprising separate bearing surfaces for receiving the vertical and lateral thrusts exerted on the shackle when in use and that I am therefore able to dispose the lateral thrust receiving surfaces at such an angle to their axes that they at all times move freely on each other without appreciable tendency to wedging action, while a comparatively light spring is all that is necessary to maintain suitable contact between them. It results that relative movement between the links and pins of the shackle takes place very freely even though the shackle is under heavy load, and that even though the bolt and in consequence the spring be improperly adjusted and/or the bearings be inadequately lubricated, the riding qualities of the car are not seriously interfered with as is the case in which but a conical bearing surface of relatively slight taper is relied upon to sustain the lateral and the vertical thrusts.

While I have herein particularly described certain shackles of different specific character embodying the invention, I do not thereby desire or intend to limit or confine myself thereto in any way, as changes and modifications in the form and arrangement of the parts thereof may be made if desired and/or other embodiments of the invention such as will readily occur to those skilled in the art may be constructed within the scope of the invention as defined in the appended claims.

Having thus described my invention, I claim and desire to protect by Letters Patent of the United States:

1. A spring shackle comprising a pair of laterally spaced oppositely disposed side links each having a pocket adjacent each of its ends, each pocket providing a conical surface and a cylindrical surface with an end of the conical surface merging into an end of the cylindrical surface, pins respectively extending into a pocket in each link and having adjacent their ends conical and cylindrical surfaces respectively substantially conforming to the corresponding surfaces in the pockets, and means operative to maintain the pins in assembled relation with the links and yieldingly insure bearing engagement of the conical surfaces of the pins with those of the respectively corresponding pockets.

2. A spring shackle comprising a pair of laterally spaced oppositely disposed side links each having a pocket adjacent each of its ends, each pocket providing a conical surface and a cylindrical surface of diameter equal to one end of the conical surface, a pair of pins extending between the links having their ends respectively seated in said pockets and providing bearing surfaces respectively substantially conforming to said cylindrical and conical surfaces therein, said pins terminating short of the bottoms of the pockets, and means for yieldingly maintaining bearing surfaces of the links in bearing engagement with corresponding surfaces of the pins.

3. A spring shackle comprising a pair of laterally spaced oppositely disposed side links each having a pocket adjacent each of its ends, each pocket having a substantially cylindrical bearing surface adjacent its bottom and an outwardly flaring frusto-conical bearing surface extending therefrom, a pair of tubular pins having corresponding frusto-conical bearing surfaces inwardly spaced from their ends and substantially cylindrical bearing surfaces extending therefrom to their extremities, the ends of each pin respectively projecting into one pocket in each link and terminating short of the bottom thereof, and means for yieldingly maintaining the links in assembled relation with the pins.

4. A spring shackle comprising a pair of pins having at their extremities cylindrical bearing surfaces of smaller diameter than the major portions of the pins and frusto-conical bearing surfaces extending oppositely in enlarging taper from the inner ends of said cylindrical surfaces, a pair of links each having a pair of pockets respectively adapted for the reception of an end of one of the pins providing a frusto-conical bearing surface and a cylindrical bearing surface of greater length than the corresponding pin surface, and means extending between the links operative to yieldingly maintain the frusto-conical bearing surfaces in the link pockets respectively in bearing engagement with the corresponding surfaces on the pins.

5. A spring shackle comprising a pair of laterally spaced oppositely disposed side links each having a pocket adjacent each of its ends, each pocket providing spaced cylindrical surfaces and an interposed frusto-conical surface, a pin engaging a cylindrical surface in a pocket in each link and having a frusto-conical surface adjacent its extremity in bearing engagement with the corresponding surface in the link pocket, and means operative to yieldingly maintain the links in assembled relation with the pins and maintain the frusto-conical surfaces of the pins and links in bearing engagement.

6. A spring shackle comprising a pair of pins having tapered ends, a pair of shackle links each having adjacent its ends a pocket providing spaced cylindrical surfaces of different diameters and an interposed tapered surface substantially conforming to the taper of the pins, the diameter of one of said cylindrical surfaces being substantially equal to that of the major portions of the pins, and means operative to maintain the links in assembled relation with the pins with the tapered surfaces of the pins respectively in bearing engagement with corresponding surfaces of the link pockets and one cylindrical surface of each pocket substantially in bearing engagement with a corresponding surface of a pin adjacent its tapered surface.

FRANK B. MULLIN.